United States Patent [19]

Fink et al.

[11] 4,271,478
[45] Jun. 2, 1981

[54] METHOD AND APPARATUS FOR MEASURING THE TRANSMISSION CHARACTERISTICS IN ELECTRICAL COMMUNICATION SYSTEMS

[75] Inventors: Helmuth Fink, Munich; Karel Van der Gucht, Deisenhofen, both of Fed. Rep. of Germany

[73] Assignee: Siemens Aktiengesellschaft, Berlin & Munich, Fed. Rep. of Germany

[21] Appl. No.: 29,015

[22] Filed: Apr. 11, 1979

[30] Foreign Application Priority Data

Apr. 21, 1978 [DE] Fed. Rep. of Germany ....... 2817646

[51] Int. Cl.$^3$ ............................................. G06F 15/20
[52] U.S. Cl. .................................. 364/580; 364/514; 455/226
[58] Field of Search ....................... 364/580, 514, 484; 325/363, 67

[56] References Cited

U.S. PATENT DOCUMENTS

| T940,015 | 11/1975 | Hoet al. | 364/300 |
| 3,629,831 | 12/1971 | Mikus et al. | 364/514 |
| 3,920,973 | 11/1975 | Avellar et al. | 364/514 |
| 3,921,072 | 11/1975 | Sato | 364/514 |
| 4,090,242 | 5/1978 | Lerma et al. | 364/514 |

Primary Examiner—Edward J. Wise
Attorney, Agent, or Firm—Hill, Van Santen, Steadman, Chiara & Simpson

[57] ABSTRACT

A method and apparatus for measuring the transmission characteristics in electrical communication transmission systems in which individual frequencies which differ from each other are consecutively produced as measuring signals at the transmitter and transmitted to the receiver through the transmission path wherein measurements of the different individual frequencies are consecutively accomplished at the receiver. So as to simplify and accelerate the method, the transmission of the individual frequencies $f_1$ through $f_n$ at the transmitter is based on a known time schedule and at the receiver the time at which the selected individual frequencies is determined for the individual frequencies, for example, $f_1$, by the use of a filtering technique. After the initial frequency is received, a time program is started at the receiver which has the same time plan as that at the transmitter. The assignment of the respective measurements relative to the individual frequencies $f_1$ through $f_n$ is accomplished according to this time program at the receiver.

7 Claims, 3 Drawing Figures

METHOD AND APPARATUS FOR MEASURING THE TRANSMISSION CHARACTERISTICS IN ELECTRICAL COMMUNICATION SYSTEMS

BACKGROUND OF THE INVENTION

1. Field of the Invention

This invention relates in general to methods and apparatus for measuring the path length in electrical communication transmission systems.

2. Description of the Prior Art

German Offenlegungsschrift No. 2,613,054 which has been filed in the United States Patent Office on Feb. 22, 1977, Ser. No. 770,266 discloses a circuit arrangement for the correction of the damping curve of a communication transmission path in which a test signal generator produces a test signal which consecutively different individual frequencies. A detector is provided at the test signal receiver and the detector detects the arrival of one of the individual frequencies used for measurement and conveys this information to a counter. This counter counts by one step further each time that an individual frequency arrives and actuates the corresponding memory devices which change the frequency of a superposition oscillator for each of the individual frequencies such that the converted intermediate frequencies have the same value. A very narrow band intermediate frequency filter can thus be employed at the receiver. The respective frequency values of each memory device is simultaneously determined. The amplitude value measured at one individual frequency together with the frequency value is available for evaluation.

It must be possible to adjust the transmission characteristics measurement methods operating with a number of individual frequencies in the total transmission range or in a partial range thereof in order to determine the respective conditions of the individual transmission paths for each frequency. As the communication transmission may not normally be interfered with, it is difficult to make operational measurements at the individual frequencies relative to their number and their distribution on the transmission frequency band and this must be adjusted to the respective operating conditions of the band such as channel width, pilot channels, control channels and so forth. Thus, in a specific transmission system, one can only measure with 10 different individual frequencies, however, in another different transmission system, the operation may be accomplished with 25 individual frequencies. If one utilizes counter circuits in the known manner at the receiver difficulties can arise in specific operating conditions in that the counter circuit may exhibit an incorrect counter value due to the failure of an individual frequency. For this instant on, all measuring values are wrongly assigned to the subsequent frequencies because the counter does not register the failure of the one individual frequency and from then on indicates a value which is too low for the counter value.

SUMMARY OF THE INVENTION

The present invention relates to a method and apparatus for measuring the transmission characteristics in communication transmission systems in which at the transmitter individual frequencies which are different to each other are consecutively produced as measuring signals and are supplied to the transmission line and at the receiver measurements of the different individual frequencies are consecutively accomplished. In the invention, the underlying objective is to make measurements of the transmission characteristics at the receiver in a simple and trouble free manner such as even upon the failure to receive one or more individual frequencies or only partially to receive such frequencies, the system still supplies a useable measuring result and the invention has many applications.

In the invention, this is accomplished at the transmitter by transmitting a plurality of individual frequencies based on a prescribed time program and at the receiver for one or more of the individual frequencies the time of occurrence of the selected individual frequencies is determined by the use of a filter circuit and from such time on a time program is commenced at the receiver which has the same time program as that at the transmitter and the assignment of the respective measurements relative to the individual frequencies is undertaken only according to this time program at the receiver.

By using the time program at the transmitter as well as the time program at the receiver which is selectively started up at the correct time which is when the correct individual frequency arrives, it is assured without great expense, that the assignment of the respective measuring values relative to the individual frequencies at the receiver and transmitter is adjusted and corrected even though one of the individual frequencies fails to occur. Although no measuring value will be present when the amplitude is zero when a level measurement occurs such as when a level measurement for damping correction is made, the remaining measuring points within the total measured frequency band covered by the individual frequencies will remain correct not only as to frequency values but also according to the amplitude values measured. An additional advantage of the invention lies in the fact that the time programs for the transmitter and receiver can be readily adjusted to respective operating conditions of the communication transmission system. Thus, the number of individual frequencies and also their chronological distribution can be adjusted in a arbitrary manner without great expense in that it is merely required that the time programs in the time sequence at the transmitter be the same as that at the receiver.

The invention also relates to a device for carrying out the inventive method wherein a flow control with a specific time program contained in a program memory is provided for making available in transmitting the individual frequencies from a test signal generator and wherein a filter circuit for filtering out one or more individual frequencies is provided at a test signal receiver with the filter circuit determines the time of the arrival of the selected individual frequency and allows it to be determined and is then furnished as a start signal to a flow control at the receiver and the flow control of the receiver includes a memory with a program stored of the time program which has the same flow plan as the one at the transmitter and the respective measurements of the individual frequencies is accomplished only according to the time program of the receiver.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
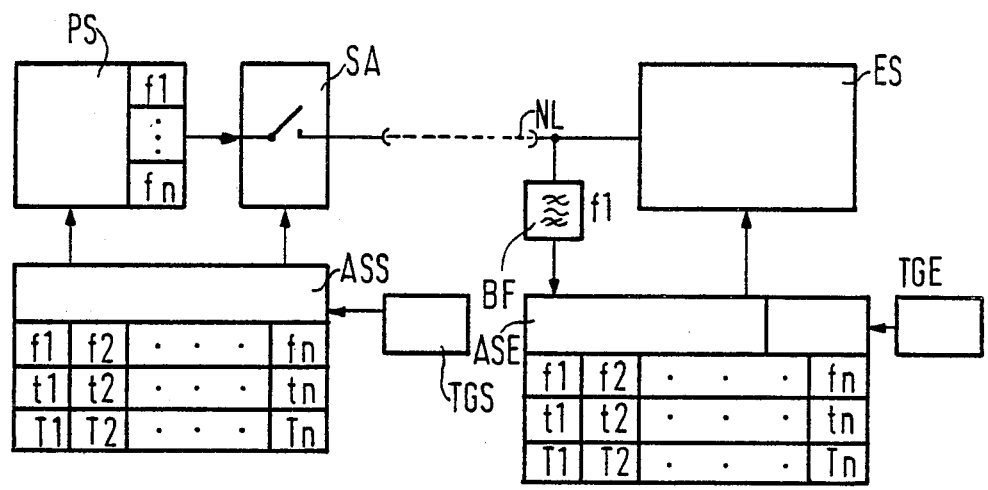
FIG. 1 is a block diagram of a test signal transmitter and test signal receiver for making the inventive measurements in a transmission line

FIG. 1 is a block diagram of the apparatus and method of the invention and discloses a test signal generator PS comprising the transmitter which is capable of generating a specific number of individual frequencies $f_1$ through $f_n$. A synthesizer can advantageously produce the individual frequencies. In order to control and determine the particular frequency range $f_1$ through $f_n$ which is to be transmitted at a particular time, an inherent flow control ASS is attached to the transmitter test signal generator PS and this flow control ASS not only determines the frequency of the signals to be transmitted $f_1$ through $f_n$ but also the time duration $t_1$ through $t_n$ of these test signals as well as the time intervals $T_1$ through $T_n$ between consecutive test signals and these are determined by a program memory storage means included in the flow control ASS. A pulse generator TGS provides an input to the flow control ASS and provides the precise chronological determination of the individual control processes of the flow control and the pulse frequency of the pulse generator is selected to be as high as possible so as to obtain a greater precision for the time signals. The individual frequencies $f_1$ through $f_n$ which are to be conveyed through the transmission line NL as test signals proceeds with a prescribed advantageously constant amplitude level. The damping distortion can be measured at the receiver through the transmission path NL by the method and apparatus of the invention. These measurements are advantageously required so as to adjust equalizers and in particular echoe or bulge equalizers. Additionally, phase measurements so as to determine for example the group flow time distortion or the phase deviations can be accomplished at the receiver. The time length $t_1$ through $t_n$ which allows the individual frequencies $f_1$ through $f_n$ to be supplied to the transmission path NL from the transmitter is determined by the switch SA which is connected to the output of the transmitter generator PS and which is opened or closed by the flow control ASS. So as to avoid the occurrence of malfunctions in the transmission channels occupied by the information transmission channels, it is desirable to accomplish the keying or gating of the individual frequencies $f_1$ through $f_n$ "softly" in other words with correspondingly slow ascending and descending flanks.

A receiver ES having a corresponding measuring circuit for example, amplitude level and/or phase meters is mounted at the receiver and could, for example, be similarly to the test signal receiver described in German Offenlegungsschrift No. 2,613,054 which corresponds to U.S. Ser. No. 770,266. One of the individual frequencies is branched off from the input of the receiver by the means of a band pass filter BF which filter does not pass the remaining frequencies and the individual frequency is supplied to the flow control ASE which contains a program storage at the receiver. A selective receiver is advantageously used for the receiver ES which can be narrow band tuned to the respective receiver signal. The band filter BF will generally already be present in the receiver because narrow band tuning is accomplished there and need not be supplied as a separate additional filter. The selecting portion of the receiver is directly connected to the flow control ASE.

It is expedient to filter the first of the individual frequencies such as frequency $f_1$ and in the present example, this is used as a start frequency because then the synchronization between the transmitting signal generator PS and the receiver ES can be accomplished at the beginning of a measuring test period TG.

Several band pass filters may be connected in parallel or multiple tunings in selective receivers can be provided for different frequencies fx when it is to be assured that an additional chronological secondary synchronization should be accomplished during the measuring test process. The time during which the frequency f5 appears when individual frequency f5 is filtered out for example, could once more be precisely determined and, if necessary, could also be corrected relative to the measurement of the individual frequency $f_1$. This procedure would also be advantageous when the first start frequencies $f_1$ is occupied or exhibits interference or if it fails altogether.

Flow control ASE includes a pulse generator TGE expediently operating at the same pulse frequency as the pulse generator TGS at the transmitter. Also, the same distribution of the individual frequencies $f_1$ through $f_n$ and the distribution of the length of the individual pulses t1 through tn and the time intervals T1 through Tn are stored in the flow control ASE at the receiver as is used at the transmitter. Thus, the time programs in the two flow controls ASS and ASE are identical and when the test operation is to be altered, for example, when measuring on a different transmission path NL merely these time programs of the transmitter and receiver would have to be altered so as to obtain an adjustment to the conditions of the respective path in a simple and rapid manner.

Figure 2:
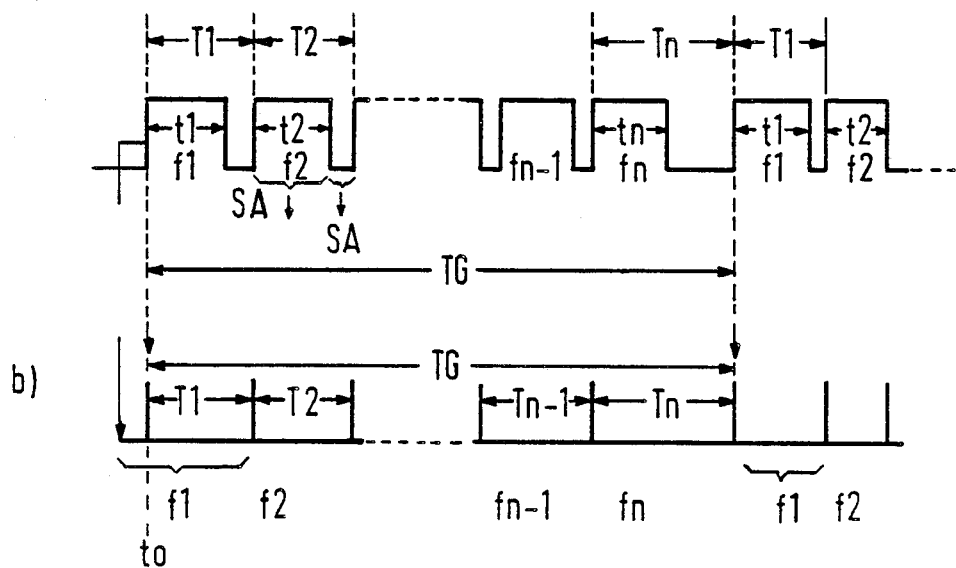
FIGS. 2a and 2b are plots of the time diagram sequences for the individual frequencies.

FIG. 2 is helpful in understanding the details of the synchronization method and comprises time tables wherein FIG. 2a illustrates the time sequence in which the individual frequencies $f_1$ through $f_n$ are transmitted at the transmitter side. The transmitter is keyed on at a time $t_0$ and a transmitter pulse occurs for a specific duration $t_1$ which is allowed to pass through switch SA. The first transmitter pulse has a carrier frequency of $f_1$ and thus forms the first individual frequency for measuring the transmission characteristics of the line NL in FIG. 1. After a short pause, during which time no signal is transmitted, a second transmitted pulse is transmitted which has a frequency of $f_2$ and a time length of t2. The time interval between the front flank of the first transmitter pulse and the front flank of the second transmitted pulse is indicated by T1.

It is simple to provide that the individual times tx and Tx for each of the n individual frequencies to be equal to each other as illustrated in FIG. 2. It can also be advantageous, however, for example, for adjusting for very strong damping distortions and for obtaining higher measurement precision to provide that the different frequencies $f_1$ through $f_n$ are transmitted for different time lengths through the transmission path and to thus make available at correspondingly different measuring time at the receiver. When the last transmitter pulse at the individual frequency $f_n$ occurs, the time length Tn is expediently selected to be somewhat longer than the other time lengths of the preceding individual frequencies to allow for a new synchronization of the receiver which can be accomplished with the band pass filter BF1 with the subsequent individual frequency $f_1$ of the next measuring period. Until all of the individual frequencies $f_1$ through $f_n$ are transmitted and before the next individual frequency $f_1$ is transmitted, the time period TG occurs. The measuring receiver ES is held in a waiting position by the flow control ASE when one measuring period is concluded until the start frequency $f_1$ again appears during the next measuring period and continuing in this fashion during succeeding sequences. The receiver is thus tuned to the start frequencies $f_1$.

FIG. 2b illustrates how the synchronization occurs at the receiver. As the first impulse transmitted by the transmitter generator PS has the individual frequency of $f_1$, this first signal arrives at the receiver after a specific transit time which may be very small. At that instant, the flow control ASE is started up due to the activation of the band pass filter BF1 or of the selective test signal receiver which makes the times t1 and T1 available. At time T1 or t1 the test signal receiver determines the level or the phase at which the individual frequency $f_1$ arrives and the measured values together with the corresponding frequency characterization of signal $f_1$ is stored in a memory device. So as to maintain the influence of the transient processes so that they are low, the measurement advantageously occurs toward the end of the respective switch-on time for example, t1. After the completion of the time T1, the switching to f2 proceeds automatically by means of the pulse control TGE of the flow control ASE and in other words the receiver ES will be tuned to a new measuring value during the time t2 which measuring value corresponds to the frequency f2 stored in a corresponding memory device and this process continues on through all of the frequencies which are transmitted between the transmitter and the receiver. This process continues until the total frequency range of interest has been scanned with the last individual frequency $f_n$ occurring for a time of tn and, thus, n measuring points for the amplitude level and/or the phase exist in the receiver ES. After the time TG has been completed, a full measuring period with all individual frequencies has occurred and the flow control ASE is placed into a waiting position with the selective receiver ES being tuned to a start frequency, for example, $f_1$ where it remains for a time period until a signal having a frequency of $f_1$ occurs at the output of the band pass filter VF. This signal causes the new passage of the different measuring processes and their assignment such that the process will be accomplished with the same time program as during the first interval. Thus, waiting periods between $f_n$ and $f_1$ occurs after the automatic flow between the signals $f_1$ and $f_n$.

As both time programs are set up to be completely the same at both the transmitter and receiver, it is assured that synchronization between the transmitter and receiver will result by the method of the invention. If one of the impulses fails to occur, for example, the individual frequency f2, no amplitude level value will be measured at this time by the receiver ES because the transmitter pulse having a frequency of $f_2$ did not arrive at the receiver. Nevertheless, all other measuring values such as $f_1$ and $f_3$ through $f_n$ will be correct and indicate the conditions of the different frequency values and the amplitude and phase of the signals in the correct manner.

Figure 3:
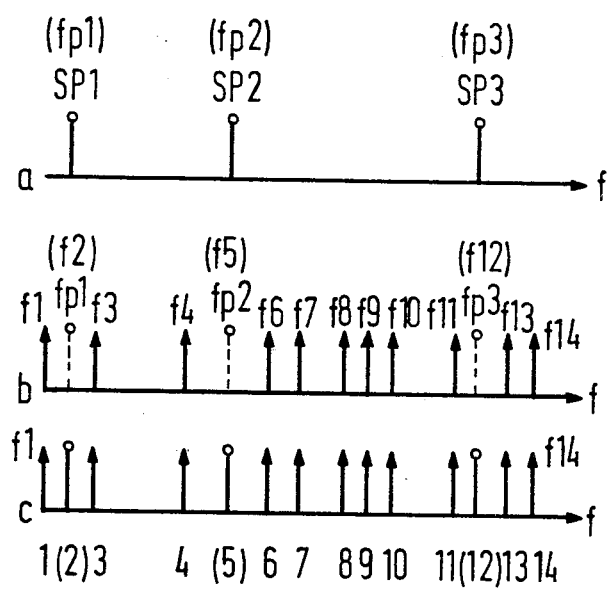
FIGS. 3a through 3c comprise a plot of the frequency plan for a transmission line with fixed pilot frequencies.

FIGS. 3a, b and c illustrates a transmission line which has three system pilot tones SP1, SP2 and SP3. These three pilots can advantageously be included into the measurement in that a corresponding measuring time can be made available for them at the receiver. The measuring test signal generator at the transmitter PS expediently produces all of the frequency signals $f_1$ through $f_n$ as, for example, 14 signals in the example illustrated in FIG. 3. In contrast, it is safeguarded that the respective individual frequencies f2, f5 and f12 are suppressed in the range of the pilot frequencies fp1, fp2 and fp3 illustrated in FIGS. 3a and b. For this purpose, the switch SA is expediently utilized which remains open during this time, for example, T2. However, at the receiver, the pilot frequency fp1, fp2 and fp3 are also measured by means of the selective measuring test signal receiver ES and, thus, the complete number of for example, 14 measuring examples are available. The inclusion of the system pilots into this measurement has the particular advantage that for the period during the distortion adjustment, it is possible to operate with switch-on system pilots and the values measured are additionally included.

In some cases, it is also expedient to completely dispense and disregard the production of individual frequencies f2, f5 and f12 which coincide with the pilot frequencies fp1, fp2 and fp3 in the measuring test signal generator transmitter and the elimination of these individual frequencies by means of the switch SA is not required. Thus, the transmitter PS does not make available any transmitter signals in the time periods T2, T5 and T12. Nevertheless, tuning for f2, f5 and f12 still occurs at the receiver whereby pilot frequencies fp1, fp2 and fp3 are received.

The individual frequencies $f_1$ through $f_n$ need not represent continuously ascending frequencies. The frequency arrangement can be descending or mixed frequency which ascend and descend in frequency between adjacent selected frequencies.

Pilot frequencies which are outside of the band should not be used as a start frequency because the time at which they occur cannot be freely selective.

The method and apparatus for controlling the frequency and sequence transmission of the signals at the transmitter are well known to those skilled in the art and for description of a system in which a series of pre-selected frequencies are repetitively transmitted, reference may be made to U.S. Pat. No. 3,965,424.

Although the invention has been described with respect to preferred embodiments, it is -ot to be so limited as changes and modifications can be made which are within the full intended scope of the invention as defined by the appended claims.

We claim as our invention:

1. A method for measuring the characteristics of a transmission line in electrical communication systems, comprising the steps of, consecutively producing in a transmitter individual frequencies ($f_1$ through $f_n$) as measuring signals which are different in frequency, supplying said signals to the transmission line and emitting said consecutively produced individual frequencies ($f_1$ through $f_n$) according to a predetermined time program, receiving said emitted signals at the receiver, filtering out at least one of said received individual frequencies and using the time of arrival of said one selected individual frequency as a start signal from which a time program is initiated at the receiver which has the same time arrangement as the time program for the transmitting of the frequencies at the transmitter and measuring the transmission characteristics at the receiver for the individual frequencies ($f_1$ through $f_n$) according to the time program at the receiver.

2. A method according to claim 1, characterized in that the emission of the individual frequencies ($f_1$ through $f_n$) at the transmitter is made at a prescribed amplitude level.

3. A method according to claim 1 characterized in that at the receiver correction measurements, in particular for a correction adjustment, are carried out on the basis of the measured values of the individual frequencies ($f_1$ through $f_n$).

4. A method according to claim 1, characterized in that the keying of the individual frequencies ($f_1$ through $f_n$) occurs with slowly ascending and descending flanks ("soft keying").

5. A method according to claim 1, characterized in that after one measuring period is completed the measuring test signal receiver (ES) is held in a waiting state and is tuned to the start frequency (f1).

6. A method according to claim 1, characterized in that at the receiver the measuring occurs towards the end of the respective switch-on time (for example, t1).

7. A device for carrying out the method for measuring the transmission characteristic of a transmission line according to claim 1, comprising a transmitter, means connected to said transmitter for causing it to emit individual frequencies ($f_1$ through $f_n$) in a time controlled sequential manner, a transmission line receiving the output of said transmitter, a filter (BF) receiving a signal from said transmission line for filtering-out one or more individual frequencies (for example, $f_1$), a measuring test signal receiver (ES) receiving the output of said filter circuit (BF) and said transmission line, and means in said receiver determining from said filter circuit output the starting point of said signals with the same flow plan existing in said receiver as the time program of the transmitter and measuring means in said receiver for measuring the characteristics of the individual frequencies ($f_1$–$f_n$).

* * * * *